US012498959B1

(12) United States Patent
Perez-Pons et al.

(10) Patent No.: US 12,498,959 B1
(45) Date of Patent: Dec. 16, 2025

(54) TRANSFORMING PROGRAM CONTROL FLOW DATA INTO SPACE-FILLING CURVES FOR ANOMALY DETECTION

(71) Applicants: Alexander Perez-Pons, Miami, FL (US); Sebastian De La Cruz, Miami, FL (US)

(72) Inventors: Alexander Perez-Pons, Miami, FL (US); Sebastian De La Cruz, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 19/274,076

(22) Filed: Jul. 18, 2025

(51) Int. Cl.
G06F 9/44 (2018.01)
G06F 9/455 (2018.01)
G06F 11/3698 (2025.01)

(52) U.S. Cl.
CPC ...... *G06F 9/45558* (2013.01); *G06F 11/3698* (2025.01); *G06F 2009/45562* (2013.01); *G06F 2009/45591* (2013.01)

(58) Field of Classification Search
None
See application file for complete search history.

(56) References Cited

U.S. PATENT DOCUMENTS

| 12,130,723 | B2 * | 10/2024 | Åberg | G06F 11/0763 |
| 2010/0011441 | A1 * | 1/2010 | Christodorescu | G06F 21/56 703/23 |
| 2018/0322004 | A1 * | 11/2018 | Jain | G06F 11/3476 |
| 2021/0067596 | A1 * | 3/2021 | Newman | H04W 4/021 |
| 2022/0171995 | A1 * | 6/2022 | Balasubramanian | G06N 20/00 |

OTHER PUBLICATIONS

Rajan Thangaveloo et al., "DATDroid: Dynamic Analysis Technique in Android Malware Detection", 2020 (Year: 2020).*
Of Benedict Mbungang Ngaibe et al., "Detecting Android Malware with Convolutional Neural Networks and Hilbert Space-filling Curves", Aug. 2024 (Year: 2024).*

* cited by examiner

*Primary Examiner* — Bradley A Teets
*Assistant Examiner* — Lanny N Ung
(74) *Attorney, Agent, or Firm* — SALIWANCHIK, LLOYD & EISENSCHENK (57) ABSTRACT

Systems and methods for transforming program control flow data into space-filling curves for anomaly detection are provided. A system includes emulating a microcontroller (MCU) in a virtual environment, mapping program control flow data onto a Hilbert space-filling curve to preserve execution locality and applying a convolutional neural network (CNN) to identify anomalies in the resulting spatial representation. The approach improves embedded system security by enabling efficient evaluation of control flow behavior.

18 Claims, 7 Drawing Sheets

TRANSFORMING PROGRAM CONTROL FLOW DATA INTO SPACE-FILLING CURVES FOR ANOMALY DETECTION

BACKGROUND

Microcontrollers (MCUs) are widely utilized as central processing components in a broad range of Internet-of-Things (IoT) devices due to their low power consumption, compact form factor, and ability to interface with sensors, actuators, and communication modules. As IoT devices become increasingly prevalent in consumer, industrial, and critical infrastructure applications, the analysis and validation of the firmware executed by these MCUs has become essential for ensuring functionality, security, and compliance. However, analyzing the firmware loaded onto a physical MCU is often difficult without access to specialized diagnostic or reverse engineering tools.

Debugging interfaces such as Joint Test Action Group (JTAG) and Serial Wire Debug (SWD) are commonly used to access the flash memory of an MCU directly and serve as primary methods for firmware analysis. However, the extraction of certain data through these interfaces can be time-consuming and, in some cases, infeasible due to security protections, hardware limitations, or lack of interface availability.

BRIEF SUMMARY

In view of the challenges discussed in the Background, the analysis of firmware embedded in the microcontroller (MCU) is essential to ensuring the security and integrity of embedded system programming. Embodiments of the subject invention provide novel and advantageous systems and methods for transforming program control flow data into space-filling curves for anomaly detection.

In an embodiment, a system for transforming program control flow data into space-filling curves for anomaly detection can comprise: a processor; and a machine-readable medium in operable communication with the processor and having instructions stored thereon that, when executed by the processor, perform the following steps: a) collecting inflection points (IFPs) representing execution behavior of an embedded program executed on a MCU emulated in a virtual environment (e.g., Quick EMUlator (QEMU)); b) mapping the collected IFPs onto a space-filling curve to generate an image-like spatial representation of the embedded program's control flow, the space-filling curve providing a locality-preserving transformation of a trace of the embedded program's control flow; and c) utilizing a machine learning (ML) model on the space-filling curve representing execution behavior to detect anomalies, thereby enabling enhanced security measures for an embedded system by modifying execution of the embedded program in response to detected anomalies. Step a) can comprise the sub-steps of: a1) virtualizing the MCU to create a virtual execution environment for the embedded program; a2) executing the embedded program within the virtualized MCU environment; a3) interfacing with the virtualized MCU using a debugger (e.g., GNU Debugger (GDB)) configured to support program state inspection and instruction tracing; a4) extracting assembly-level instructions from the virtualized MCU during execution; a5) monitoring memory of the virtualized MCU for changes occurring during execution; and a6) collecting data corresponding to one or more IFPs during execution of the embedded program via the debugger interface. Step b) can comprise the sub-steps of: b1) determining an order of the space-filling curve based on the length or dimensional requirements of data of the trace; b2) generating a representation of the space-filling curve having a coordinate space sufficient to accommodate all data points in the trace; b3) mapping each data point from the trace to a unique coordinate on the space-filling curve, following the traversal path of the space-filling curve; b4) determining a memory location associated with each data point based on its origin in the embedded program's execution; b5) assigning a color value, including a red-green-blue (RGB) value, to each data point based on its associated memory location or region within the address space; and b6) rendering a visual representation of the mapped trace data on the space-filling curve, that the assigned RGB values visually encode memory distribution or program control flow behavior. Each coordinate on the space-filling curve corresponding to a pixel in the generated image representation. The ML model used in step c) can comprise a convolutional neural network (CNN). The program control flow trace can comprise a single iteration over a main loop of the embedded program, capturing all IFPs, each iteration generating a corresponding execution trace. The IFPs can include control-transfer instructions can comprise conditional branch instructions, unconditional jump instructions, and subroutine call instructions. The trace can comprise a list of memory locations corresponding to IFPs in the program control flow. The space-filling curve can comprise a Hilbert curve used to preserve locality in the spatial mapping. The space-filling curve can further comprise an order that defines a maximum capacity of data points, with the number of data points in the execution trace constrained to be less than the total number of points corresponding to the order of the space-filling curve.

In another embodiment, a method for transforming program control flow data into space-filling curves for anomaly detection can comprise: a) collecting IFPs representing execution behavior of an embedded program executed on an MCU emulated in a virtual environment (e.g., QEMU); b) mapping the collected IFPs onto a space-filling curve to generate an image-like spatial representation of the embedded program's control flow, the space-filling curve providing a locality-preserving transformation of a trace of the embedded program's control flow; and c) utilizing an ML model on the space-filling curve representing execution behavior to detect anomalies, thereby enabling enhanced security measures for an embedded system by modifying execution of the embedded program in response to detected anomalies. Step a) can comprise the sub-steps of: a1) virtualizing the MCU to create a virtual execution environment for the embedded program; a2) executing the embedded program within the virtualized MCU environment; a3) interfacing with the virtualized MCU using a debugger (e.g., GDB) configured to support program state inspection and instruction tracing; a4) extracting assembly-level instructions from the virtualized MCU during execution; a5) monitoring memory of the virtualized MCU for changes occurring during execution; and a6) collecting data corresponding to one or more IFPs during execution of the embedded program via the debugger interface. Step b) can comprise the sub-steps of: b1) determining an order of the space-filling curve based on the length or dimensional requirements of data of the trace; b2) generating a representation of the space-filling curve having a coordinate space sufficient to accommodate all data points in the trace; b3) mapping each data point from the trace to a unique coordinate on the space-filling curve, following the traversal path of the space-filling curve; b4) determining a memory location associated with each data point based on its origin in the embedded program's execution; b5) assigning a color value, including an RGB value, to each data point based on its associated memory location or region within the address space; and b6) rendering a visual representation of the mapped trace data on the space-filling curve, that the assigned RGB values visually encode memory distribution or program control flow behavior. Each coordinate on the space-filling curve corresponding to a pixel in the generated image representation. The ML model used in step c) can comprise a CNN. The program control flow trace can comprise a single iteration over a main loop of the embedded program, capturing all IFPs, each iteration generating a corresponding execution trace. The IFPs can include control-transfer instructions can comprise conditional branch instructions, unconditional jump instructions, and subroutine call instructions. The trace can comprise a list of memory locations corresponding to IFPs in the program control flow. The space-filling curve can comprise a Hilbert curve used to preserve locality in the spatial mapping, the space-filling curve can further comprise an order that defines a maximum capacity of data points, with the number of data points in the execution trace constrained to be less than the total number of points corresponding to the order of the space-filling curve. Any or all steps or sub-steps can be performed by a processor.

BRIEF DESCRIPTION OF DRAWINGS

FIG. 1 shows the first three iterations of a Hilbert curve, a recursive geometric pattern made up of interlocking rectangular paths. In the first iteration, a simple angular path is drawn, forming a basic U-shaped structure with vertical segments extending upward. The second iteration builds upon the structure established in the first iteration by replicating and embedding smaller versions of the initial shape at the top ends and within the base of the original structure, extending the overall design both vertically and horizontally in a symmetric fashion. The third iteration further refines the previously established pattern by inserting smaller versions of the shape into the spaces created during the second iteration. The repeated insertions of smaller versions of the shape generate a complex, nested configuration of angular paths, with each new level maintaining the proportions and orientation of its predecessor. The entire arrangement results in a fractal-like pattern, growing in intricacy with each iteration while preserving the symmetry and alignment of the original shape.

FIG. 3 shows a first iteration of a main loop on a "Hello World" embedded program, mapped along a fourth-order Hilbert curve. The figure presents a grid-based visualization of memory access traces mapped onto a two-dimensional (2D) space, with coordinates labeled along the x-axis and y-axis. A continuous path connects a series of evenly spaced circular nodes arranged on a 16×16 grid. Each node represents a memory address, and the path traces the sequence of memory accesses over time. Though the figure originally uses a red-green-blue (RGB) color gradient to represent memory values, with darker shades indicating lower values and lighter shades indicating higher values, one can interpret the intensity of the node markings as signifying varying memory address ranges. A vertical legend on the right side of the figure maps relative memory values, ranging from a lower boundary at the bottom to a higher boundary at the top. Additionally, a faint, underlying geometric outline resembling the Hilbert curve is visible in the lower-right quadrant, suggesting a spatial reference or mapping structure 15 for the memory trace data.

DETAILED DESCRIPTION

Figure 8:
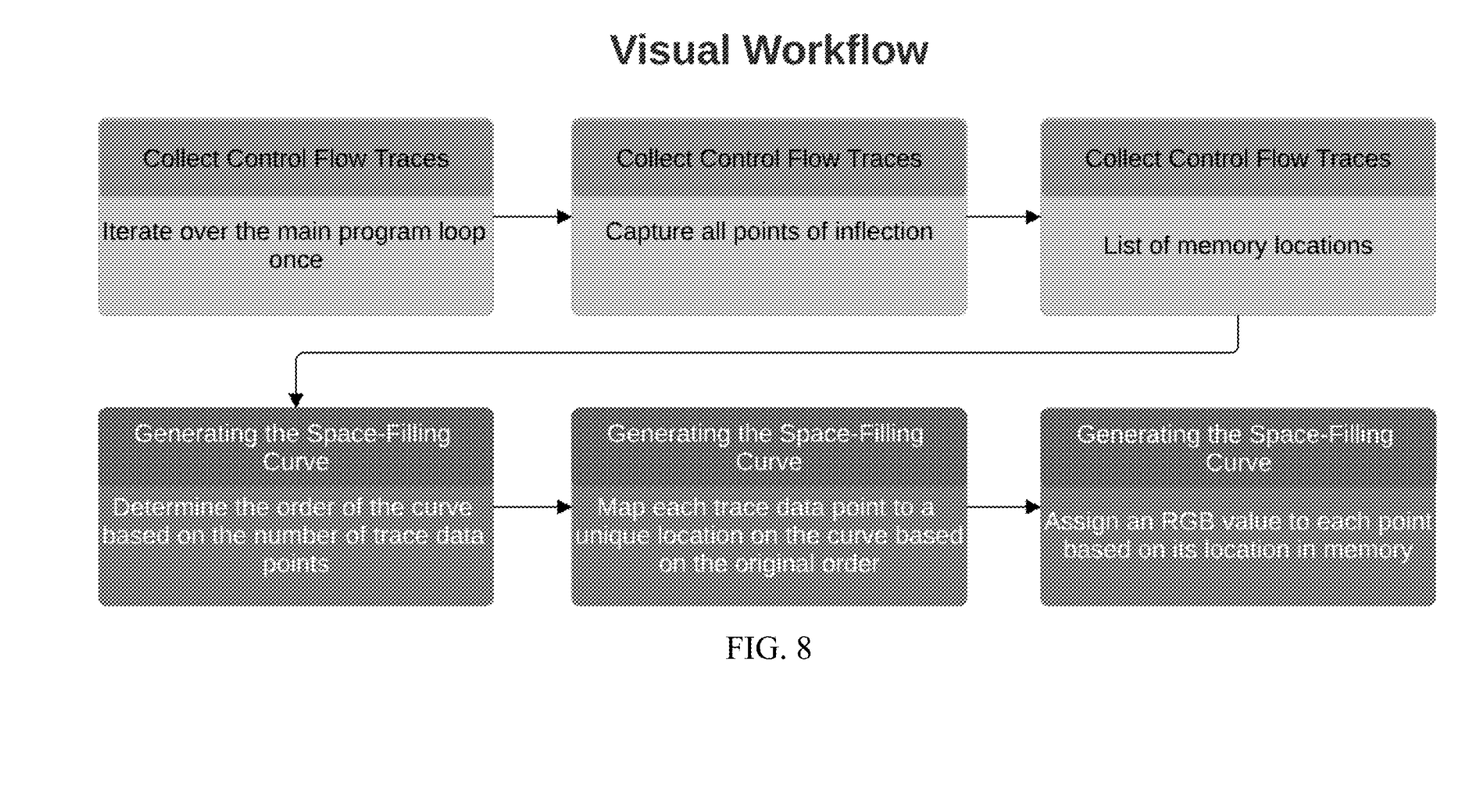
FIG. 8 shows a visual workflow of a system for transforming program control flow data into space-filling curves for anomaly detection, according to an embodiment of the subject invention.

Embodiments of the subject invention provide novel and advantageous systems and methods for transforming program control flow data into space-filling curves for anomaly detection. As shown in FIG. 8, a visual workflow of a system configured to perform the transformation of program control flow data into space-filling curves is provided. The subject matter described herein relates to collecting inflection points (IFPs) from an embedded program executed by a microcontroller (MCU) emulated using Quick EMUlator (QEMU). The collected IFPs correspond to specific locations within the execution trace of the embedded program where the control flow changes direction or path. These IFPs are mapped onto a space-filling curve to provide a spatial representation that visualizes the control flow of the MCU program during execution. IFPs include conditional branch instructions, unconditional branch instructions, and subroutine call instructions. IFPs represent critical decision points or control-transfer events that delineate different execution paths and are essential for characterizing the runtime behavior of the embedded program. MCU emulation refers to a process or system in which software-based tools or dedicated hardware components replicate the functional behavior and timing characteristics of a physical MCU, enabling debugging, testing, and verification of embedded code in an environment functionally equivalent to the target device. Each data point on the space-filling curve corresponds to an IFP, with an associated a red-green-blue (RGB) color indicating the memory location of the event. This visual representation enables the identification of anomalous or adversarial behavior during program execution. The resulting data can serve as input for machine learning (ML)-based anomaly detection techniques, thereby supporting enhanced security measures for embedded systems.

QEMU is a machine emulator capable of executing a target operating system within a virtual machine environment and emulating a target Central Processing Unit (CPU) architecture on a different host CPU architecture. QEMU operates by translating target CPU instructions using a dynamic binary translation engine known as the Tiny Code Generator (TCG). One advantage of employing a virtual machine for program execution is the enhanced debugging capability that the virtual machine provides. For example, the virtual machine may be paused for inspection, reverted to a prior execution state, or restored to a previously saved state, thereby facilitating detailed program analysis and testing. The disclosed system employs QEMU to virtualize a MCU for the purpose of collecting program control flow data during emulation. The virtual environment enables efficient extraction of assembly-level instructions loaded onto the emulated MCU. In addition, the emulation facilitates monitoring of the MCU's memory to detect changes during program execution. QEMU, serving as the primary tool, provides both instruction-level tracing and memory monitoring capabilities through virtualization, thereby simplifying the process of interacting with an executing program and acquiring relevant operational data.

A space-filling curve, such as a Hilbert curve, provides a mechanism for mapping one-dimensional (1D) data into a two-dimensional (2D) space while preserving the locality and sequence of the data. The Hilbert curve is capable of continuously covering every point within a defined space and exhibits self-similarity, wherein each iterative construction resembles the overall structure, a characteristic commonly associated with fractals and unique to space-filling curves. Each data point in the 1D domain corresponds to an ordered pair in the 2D space defined by the Hilbert curve. Data points with similar magnitude, but differing positions within the sequence of data may be positioned adjacently on the curve, irrespective of the time of capture.

Figure 1:
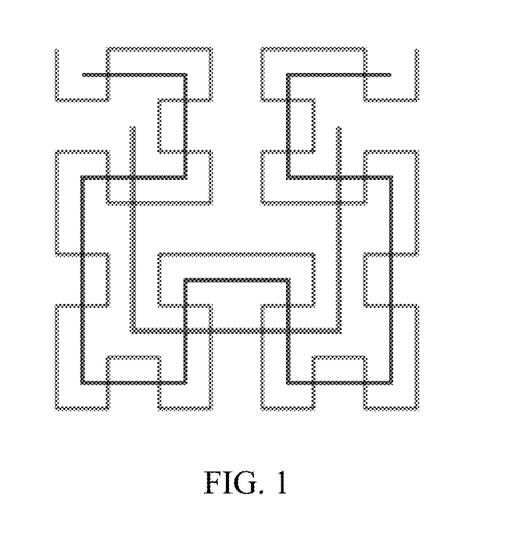

FIG. 1 shows the first three iterations of the Hilbert curve. The first iteration is depicted as a basic curve, followed by the second iteration with increased complexity, and the third iteration with further refinement. The construction of the curve involves duplicating the initial shape four times and connecting the resulting segments to form the next iteration. For example, the second iteration is generated by duplicating the first iteration four times and connecting the segments accordingly. The third iteration is similarly produced by duplicating the second iteration four times and connecting the resulting segments. This iterative process may be repeated to generate an n-th order Hilbert curve, resulting in a structure with self-similarity and fractal-like properties.

The present disclosure combines the advantages of MCU virtualization for extracting program control flow with the applications of space-filling curves to facilitate novel methods of data analysis and the integration of ML. When code is loaded onto an MCU, the program, comprising a sequence of assembly instructions, is stored within a designated memory region. Program control flow data refers to events in which the program execution deviates from a linear sequence, such as through jumps, loops, or branches to alternate memory locations. Within these assembly instructions, control flow is determined by various types of instructions, including conditional branch instructions that direct execution based on evaluated conditions, unconditional branch instructions that cause an immediate transfer of control, and function calls that invoke subroutines or procedures, and characterizes the runtime behavior of the program. These instructions collectively define the execution path of the embedded program. By analyzing the control flow behavior, a representative signature of the program can be generated.

Embodiments described are directed to identifying assembly instructions in memory that result in changes to program control flow, referred to as execution IFPs. Mapping the IFPs onto a space-filling curve provides a visual representation of the control flow behavior of the program. The use of the space-filling curve enables spatial locality to be preserved, grouping nearby memory addresses together, while also maintaining the sequential order in which memory addresses are accessed. Establishing a consistent pipeline between data extraction and mapping onto the space-filling curve facilitates a streamlined approach to MCU program control flow analysis. A trace-to-image mapping method is provided that generates information-rich representations and is adapted to serve as a dataset for research and analysis of program execution behavior. A trace is a time-ordered record of a program's execution events, such as instructions, function calls, memory accesses, or control flow transitions, used for analyzing runtime behavior. The absence of efficient data collection methods has limited the pace of advancement in this domain. Accordingly, designing tailored data collection techniques improves the efficiency and accuracy of program behavior analysis and supports the development of advanced anomaly detection systems. The present disclosure introduces a data collection and visualization approach using space-filling curves to represent control flow behavior from programs executed on emulated MCUs.

A point cloud comprises a set of points in a space, often representing a three-dimensional (3D) shape. Voxelization is a process that converts the point clouds or continuous 3D objects into discrete volumetric elements, known as voxels, arranged on a 3D grid. This conversion preserves spatial locality and geometric features, making voxelization on a primary method for representing data in 3D space.

HilbertNet preserves the spatial locality inherent in voxelization methods while reducing computational complexity. The Hilbert curve is a locality- and geometry-preserving mapping function that enables representation of multidimensional data in lower dimensions. By encoding a 3D voxel grid using the Hilbert curve, the data can be transformed into a 1D sequence and further mapped into a 2D representation suitable for processing by 2D convolutional neural networks (CNNs), thereby enhancing feature extraction efficiency. Hilbert curve traverses every point in a multidimensional space without repetition, effectively linking all elements to facilitate dimensionality reduction.

Designing the HilbertNet begins with voxelization of point clouds to establish the 3D spatial locality. The Hilbert curve is subsequently applied slice-by-slice to transform the voxelized data into a 2D image. Following dimension reduction, a local feature extraction module, Hilbert pooling, and a global feature extraction module, Hilbert attention, are employed. Integration of 2D features with 1D features is performed via Hilbert interpolation to enhance feature representation. This sequence of operations constitutes the HilbertNet framework, which enables complex processing tasks with reduced computational overhead and lower Graphics Processing Unit (GPU) utilization. The present disclosure introduces a novel approach for efficient processing of 3D point cloud data by dimensionality reduction that preserves spatial locality through Hilbert curve encoding and associated operations.

The disclosed approach utilizes emulation of the STM32F103C8 MCU, commonly referred to as the "Blue Pill," implemented using the QEMU virtualization platform. The STM32F103C8 is part of the STM32F100 series of MCUs. STM32 MCUs are widely used across various industries due to their adaptability, energy efficiency, and robust architecture. The STM32F103C8 is selected for emulation based on its availability within QEMU's supported hardware boards. However, the data collection and transformation pipeline described herein, comprising program control flow extraction and mapping onto a space-filling curve, is not limited to this specific MCU and may be applied to any compatible MCU architecture. QEMU is capable of emulating both 32-bit and 64-bit ARM processors. In the present implementation, the STM32 MCU includes an ARM Cortex-M3 processor. The STM32 MCU includes a processor based on the ARM architecture, a widely adopted Reduced Instruction Set Computing (RISC) architecture developed by Arm Ltd. While certain external peripherals such as the camera interface, Direct Memory Access (DMA) controller, and inter-integrated circuit ($I^2C$) controller are not included in the emulation, their absence does not impact the integrity of the data collected. If access to additional peripherals is required, the STM32 emulation environment within QEMU may be modified to incorporate such components. One limitation associated with emulation is the inability to collect physical sensor data. While a virtual sensor may be implemented to simulate sensor behavior, such simulation cannot fully replicate physical input data.

To generate program control flow for analysis, two embedded programs are compiled using the Arduino Integrated Development Environment (IDE). The first is a basic "Hello World" embedded program, and the second is a more complex program referred to as the "controlflow" embedded program, which comprises multiple function calls, random number generation, and several output statements. This comparison is conducted to illustrate the contrast in execution behavior between a simple program and a complex one. The "controlflow" program exhibits a more dynamic and intricate control flow due to its inclusion of branching logic and stochastic operations. In the Arduino IDE, the "Generic STM32F1 Series" board is selected, with the board part number specified as "Blue Pill F103C6," for the purpose of exporting the compiled code as a binary file compatible with QEMU emulation. Selection of the board model influences the compilation process, as different STM32 boards allocate program code to distinct memory regions. The resulting binary file is used as the kernel image during STM32 emulation in QEMU. This procedure is performed for both the "Hello World" program and the "controlflow" program to facilitate comparative analysis.

Due to the cyclic execution pattern of MCU programs, the primary focus of analysis is the code segment that executes repeatedly during the main loop. In addition to loop-specific code, the compiled binary file also includes initialization code required by the MCU to properly load and configure the program within designated memory regions. For all evaluated programs, the initialization sequence is generally consistent, with program-specific differences manifesting primarily within the main loop. This observation is confirmed by loading both binary files into the Ghidra reverse engineering framework and comparing the setup portions of the "Hello World" and "controlflow" programs. Ghidra comprises software modules that disassemble and decompile machine code from multiple architectures and file formats into a human-readable form, providing a graphical interface and scripting tools to facilitate malware analysis, debugging, and code verification, thereby enhancing software analysis. Both programs contain an identical sequence of initialization instructions, although located at different memory addresses. These differences in memory placement are attributable to the inclusion of external libraries. The "Hello World" program does not import any external libraries, whereas the "controlflow" program includes four libraries from the standard C library, resulting in additional memory allocation. Based on this analysis, the initialization phase is excluded from further control flow analysis, and only the main loop is considered. The starting and ending memory addresses of the main loop are identified and recorded for use with the GNU Debugger (GDB) during trace generation.

The primary tools employed for capturing program control flow comprise QEMU emulation with execution block logging enabled and ARM GDB. The execution block logging mode in QEMU records the starting address of each executed basic block, defined as a sequence of instructions with a single entry and exit point, thereby tracing control flow and detecting branches and loops without logging individual instructions. This approach efficiently captures high-level execution patterns, such as branch targets and loop repetitions, while minimizing log size, serving as the principal method for control flow data acquisition. ARM GDB functions as the primary interface for controlling the emulation, enabling connection to the paused QEMU instance for detailed analysis, including inspection of assembly instructions and manipulation of processor registers. After running the emulation, GDB is used to view assembly instructions and set breakpoints at the beginning and end of the main loop. This approach serves as the primary method for generating control flow traces, as the emulation pauses after each iteration of the main loop. To extract data from the emulation, the program is run in debug mode by adding the "-s -S" command line arguments, which cause the emulation to pause at the first executed instruction and await an incoming GDB connection on the default port 1234. Once connected, GDB is employed to control the emulation and extract various data. Each time the emulation reaches the breakpoint at the beginning of the main loop, the "monitor" command writes the execution block log to a text file. The resulting output comprises a list of traces corresponding to each branch to a different address. The analysis prioritizes branch locations over branch instructions, given that all branch instructions are treated as equally significant. A pipeline is implemented to automate GDB commands, preprocess the collected data, and convert the data into a Hilbert curve representation.

The control flow of the program is influenced by branch instructions, comparison operations, and function calls, which may include system calls. Python is utilized to automate GDB commands and extract branch addresses logged in the trace files. The Python libraries employed include "re" for regular expression operations to match specific string patterns, and "pexpect" to initiate and control subprocesses within the program. The Python script leverages "pexpect" to automate GDB commands such as connecting to the emulation and retrieving instruction information, while the "re" library filters targeted memory addresses using regular expressions. MCU code exhibits repetitive execution behavior, as MCUs are designed to perform specific tasks in a predictable, continuous, and often real-time manner. The executed code follows a defined sequence of steps, repeatedly returning to the execution starting point in each iteration. During execution, only a subset of branch statements is encountered, whereas the unexecuted branches remain dormant unless activated by changes in program state or external inputs.

Figure 2:
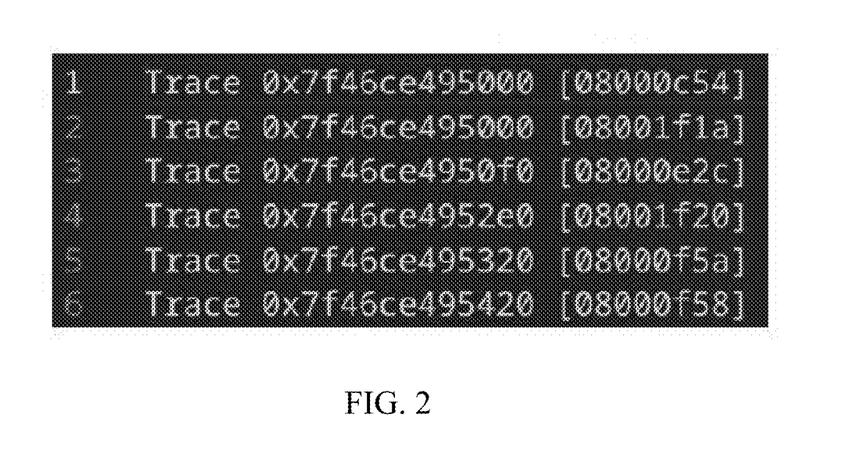
FIG. 2 shows an example format of generated traces. Hexadecimal memory addresses enclosed in square brackets represents inflection points (IFPs) corresponding to specific locations in embedded program execution.

The "generate trace" function generates a specified number of traces, saving each trace to an individual text file. The function sets breakpoints at the beginning and end of the main loop and bypasses the initialization portion of execution, since the initialization executes only once and remains constant across program runs. Upon completion of each main loop iteration, a new trace file is created containing all branch instructions taken during that iteration. By storing each trace in a separate file, the traces can be individually plotted as Hilbert curves and compared. FIG. 2 shows an example format of the generated traces, where the hexadecimal memory addresses within square brackets represent the IFPs encountered during program execution.

A 2D Hilbert curve is a continuous fractal space-filling curve that maps a 1D interval onto a 2D space. The curve is defined as the limit of a sequence of discrete approximations, each comprising a piecewise-linear path that progressively fills the 2D space with increasing density. The path initiates at coordinate (0,0), traverses all integer points within a $2^n-1 \times 2^n-1$ grid, and terminates at coordinate $(2^n-1, 0)$. With increasing order n, the path pattern repeats recursively. The selection of order n for the Hilbert curve depends on the cardinality of the trace data set, as the number of points increases exponentially; specifically, an order n+1 curve contains four times the points of an order n curve. To accurately represent all collected trace data, the cardinality of the points available on the Hilbert curve must exceed the cardinality of the data points of the trace data set.

Let A represent the set of trace data and, let B represent the total number of points available for mapping onto a Hilbert curve. To accurately represent the data, the cardinalities satisfy the relation:

$$|A| \le |B|$$

where $|\cdot|$ denotes the cardinality of a set.

Upon generating the trace files, the "extract values from file" function extracts all branch addresses from each trace and stores them as a list. The length of the traces remains consistent among traces of the same program but varies significantly when comparing different programs.

A function is implemented utilizing the Python library "hilbertcurve 2.0.5" to map a 1D sequence of values onto a 2D Hilbert curve. Prior to generating the Hilbert curve, two parameters are set, the number of dimensions and the number of iterations. The number of dimensions is set to 2 to produce 2D images, as the input data is 1D, making higher-dimensional curves unnecessary. The number of iterations is selected based on the length of the trace data, and increasing iterations enhances the resolution of the curve and the number of data points, thereby improving the preservation of data locality.

All memory addresses are unique and do not repeat. This behavior is represented in the Hilbert curve by assigning the index of each branch memory address in the list to a corresponding location on the curve, thereby preserving the sequence in which the data is recorded. Subsequently, a color, represented in RGB format, is assigned to each point based on the memory address's location within the total memory range. The generated trace files comprise lists of branch memory addresses corresponding to branch locations taken during program execution. The execution sequence of branch instructions is represented by traversal along the Hilbert curve path, with each point on the curve corresponding to a specific branch address. The RGB color assigned to each point encodes the precise memory location of the respective branch instruction, thereby enabling spatial and temporal correlation of program control flow within the address space. To mitigate noise, only branch instructions are captured owing to their significance in the analysis, whereas memory addresses corresponding to non-branch instructions are excluded, as they do not influence program control flow.

Many memory addresses are located in close proximity, thereby complicating the assignment of distinct colors. This challenge is addressed by applying a hash function to the memory addresses to achieve a more uniform distribution across the color spectrum. A color gradient ranging from black to red to white is employed to represent the lowest to highest memory addresses recorded in the trace. The resulting control flow trace is mapped onto a Hilbert curve, wherein memory addresses with similar values are represented by similar colors and positioned according to their sequential occurrence during program execution. This process consistently produces a 2D image, with the image size determined by the order of the Hilbert curve utilized.

Embodiments of the subject invention provide a focused technical solution to the focused technical problem of how to transform program control flow data into space-filling curves for anomaly detection. The solution is provided by the integration of MCU emulation within a virtual environment, the mapping of program control flow data onto space-filling curve in the form of Hilbert curve to preserve execution locality, and the application of an ML model in the form of a CNN trained to detect anomalous patterns within the resulting spatial representations. The technical solution provided by embodiments of the subject invention is specific to computer technology, addresses a technical problem in the field of embedded systems security, and improves computer system functionality by enabling the detection of abnormal execution behavior through transformation of control flow data, thereby supporting a focused and practical application in embedded system cybersecurity evaluation.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (including any value or subrange contained therein) are intended to be explicitly included. When the term "about" or "approximately" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Materials and Methods

Analysis of the Hilbert curves generated from two traces of the "Hello World" embedded program and two traces of the "controlflow" embedded program reveals distinct structural patterns indicative of the differing control flow and execution behavior of each program. Execution traces corresponding to each program were analyzed and compared both with one another and in relation to the underlying program structure. The "Hello World" program, being a simple application, produced relatively short execution traces, each comprising approximately 200 to 250 branch instructions. Due to the limited size of the execution traces associated with the "Hello World" program, the execution paths were suitably represented using a fourth-order Hilbert curve, which provided sufficient resolution for complete visualization. In contrast, the "controlflow" program exhibited significantly greater complexity, with trace lengths ranging from approximately 5,500 to 6,500 branch instructions. To visualize the longer execution traces associated with the "controlflow" program, Hilbert curves of sixth-order and seventh-order were utilized. However, a sixth-order Hilbert curve proved insufficient to accommodate the full length of the traces, while a seventh-order curve, though sufficient in capacity, resulted in reduced visual clarity due to its higher resolution. Although minor variations in trace length occurred across different iterations of the main program loop, each trace consistently terminated at the same memory address, indicating a stable program endpoint across executions.

Example 1

Figure 3:
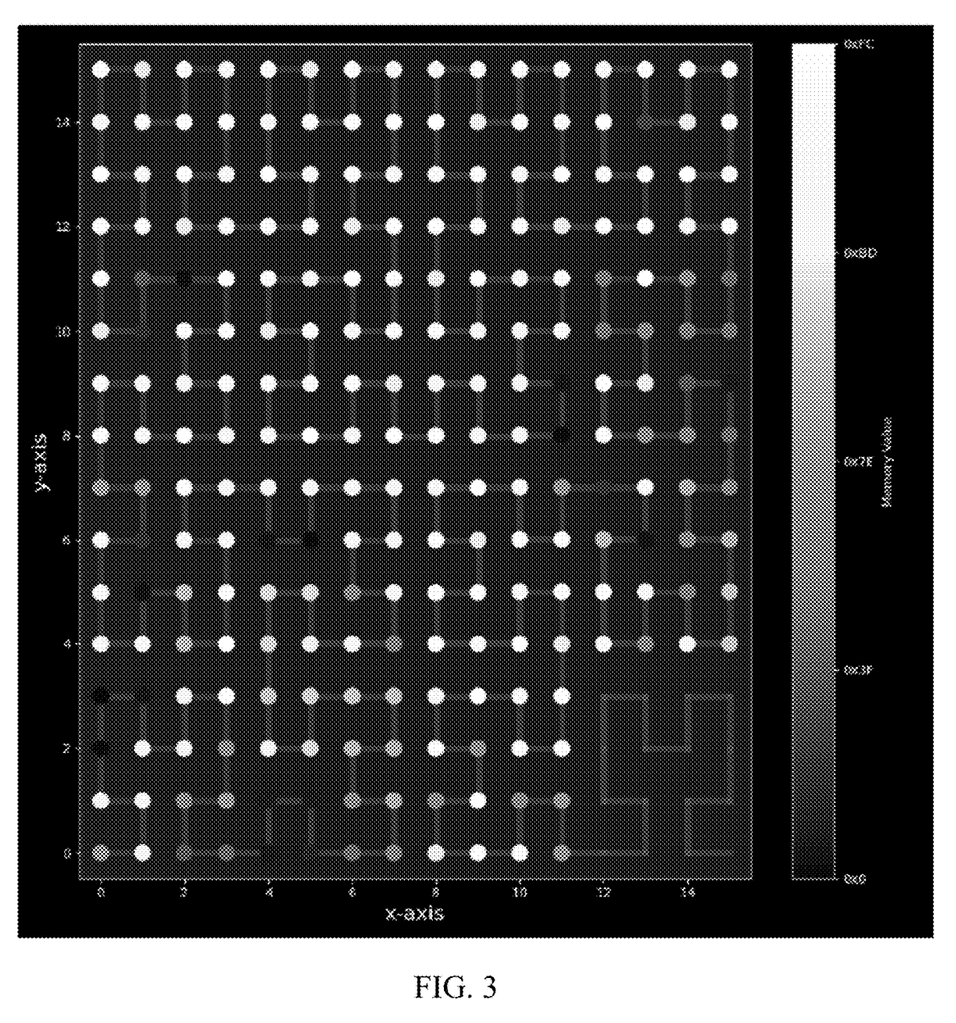

FIG. 3 shows a first iteration of a main loop of the "Hello World" embedded program, mapped onto a fourth-order Hilbert curve. The plot comprises a total of 256 data points, while the trace length comprises 240 values, resulting in an unoccupied region located in the lower right corner of the plot. A first-order Hilbert curve commences at the lower left corner coordinate (0,0), progresses upward by one unit to coordinate (0,1), then proceeds rightward to coordinate (1,1), and concludes at coordinate (1,0). This sequence constitutes one iteration of the curve and is recursively repeated at each higher order. Analysis of FIG. 3 indicates that the majority of memory addresses accessed during execution of the program are concentrated toward the higher address range, proximate to 0×FF, with relatively few data points corresponding to addresses within the lower memory range.

Figure 4:
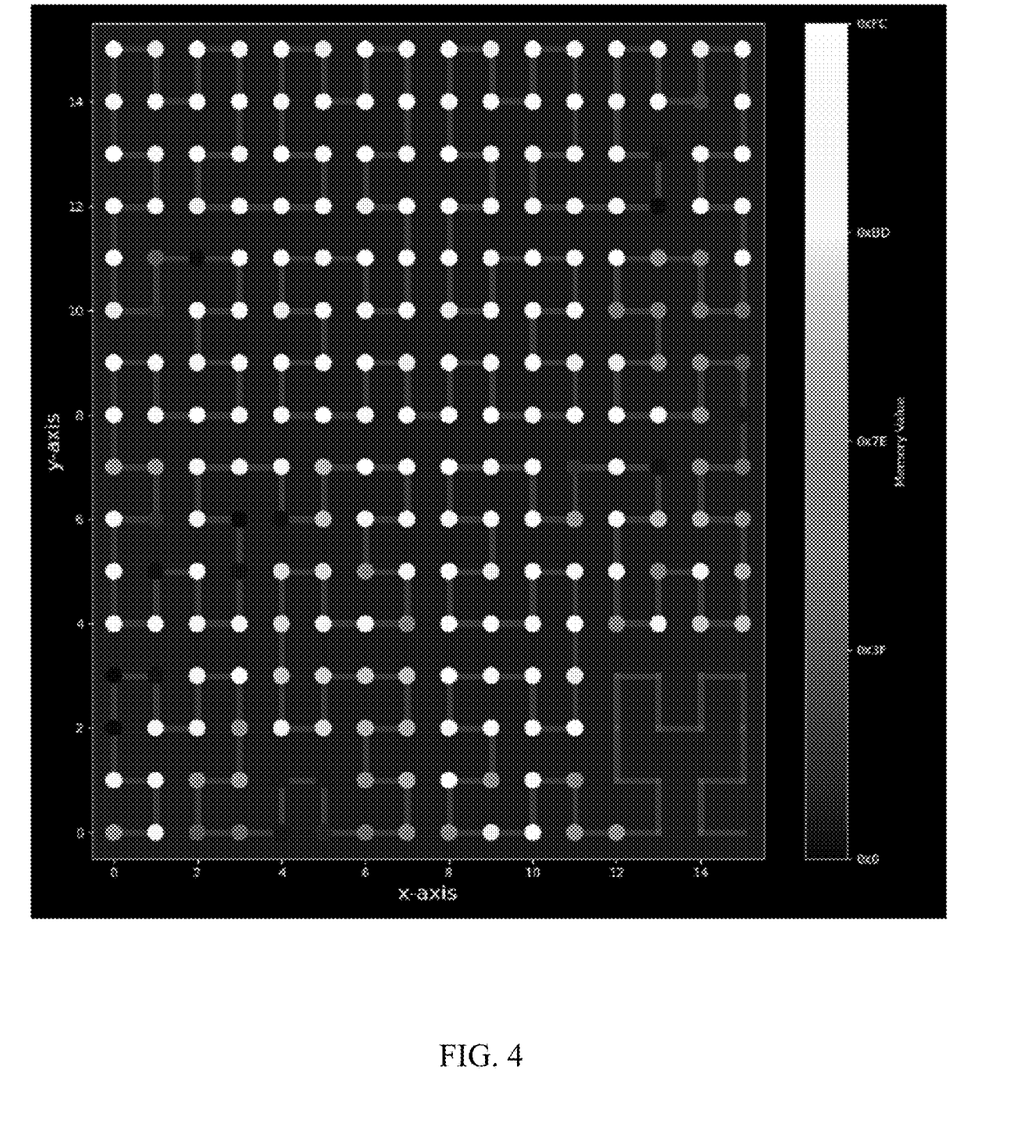
FIG. 4 shows a second iteration of the main loop on the "Hello World" embedded program, mapped along a fourth-order Hilbert curve.

FIG. 4 shows a second iteration of the main loop of the "Hello World" embedded program, mapped onto a fourth-order Hilbert curve. Unlike the first trace, the second trace comprises 241 memory addresses, representing a single additional address compared to Trace 1. The observed variation can be attributed to changes in the processor state and built-in optimizations. One example is branch prediction, where the processor will predict if a branch will be taken or not based on certain factors. As expected, Trace 2 looks almost identical to Trace 1 due to the program repeatedly printing "Hello World" without any changes. It can be inferred from these traces, that the rest of the main loop iterations will look the same.

Example 2

Figure 5:
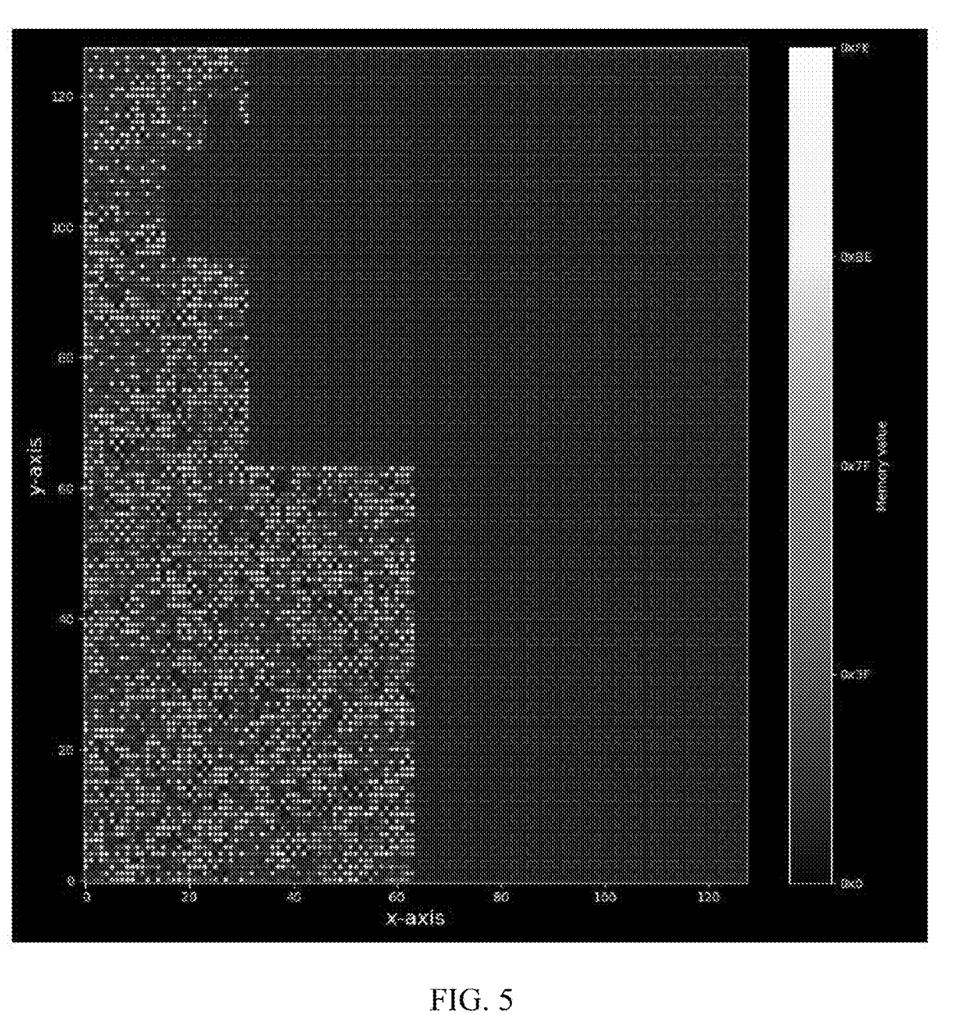
FIG. 5 shows a first iteration of a main loop on a "controlflow" embedded program, plotted along a seventh-order Hilbert curve.

FIG. 5 illustrates a first iteration of a main loop of the "controlflow" embedded program, plotted on a seventh-order Hilbert curve. The plot is capable of displaying up to 16,384 data points. However, Trace 1 comprises 5,832 memory addresses, resulting in an unoccupied area on the right side of the plot. A seventh-order Hilbert curve was selected to represent the trace data because its cardinality exceeds that of the trace. In contrast, a sixth-order curve, which can represent a maximum of 4,096 data points, is insufficient to visualize the entire trace. Comparative analysis with the "Hello World" program reveals that the "controlflow" program exhibits significantly greater length and increased variation in memory addresses. Furthermore, the majority of the memory addresses accessed within the trace are concentrated predominantly within the middle two quadrants of the address range.

Figure 6:
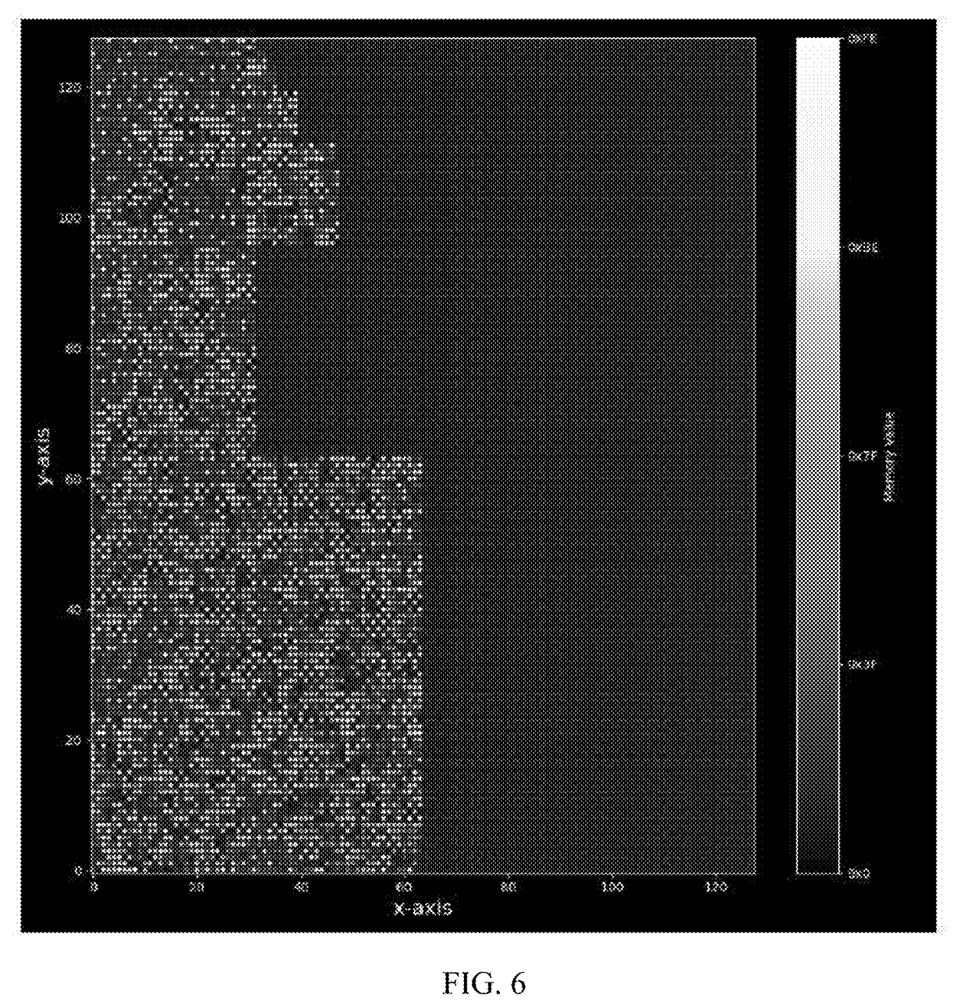
FIG. 6 shows a second iteration of the main loop on the "controlflow" embedded program, plotted along a seventh-order Hilbert curve.

FIG. 6 depicts a second iteration of the main loop of the "controlflow" embedded program, plotted on a seventh-order Hilbert curve. Unlike the first trace, the second trace comprises 6,484 memory addresses, exceeding the length of Trace 1. The "controlflow" program incorporates a random number generator and conditional statements dependent upon the generated value. Specifically, if the generated number is less than ten, the number is squared; if the number exceeds ten, the square root of the number is computed instead. These distinct functions perform different operations, reside in separate regions of memory, and vary in length. Such functional and structural differences account for the substantial disparity in length between Trace 1 and the second trace. Comparative analysis of both traces further reveals that regions within the plot exhibit differing colors corresponding to each trace, thereby illustrating variation between the traces, in contrast to the uniformity observed in the "Hello World" program.

Figure 7:
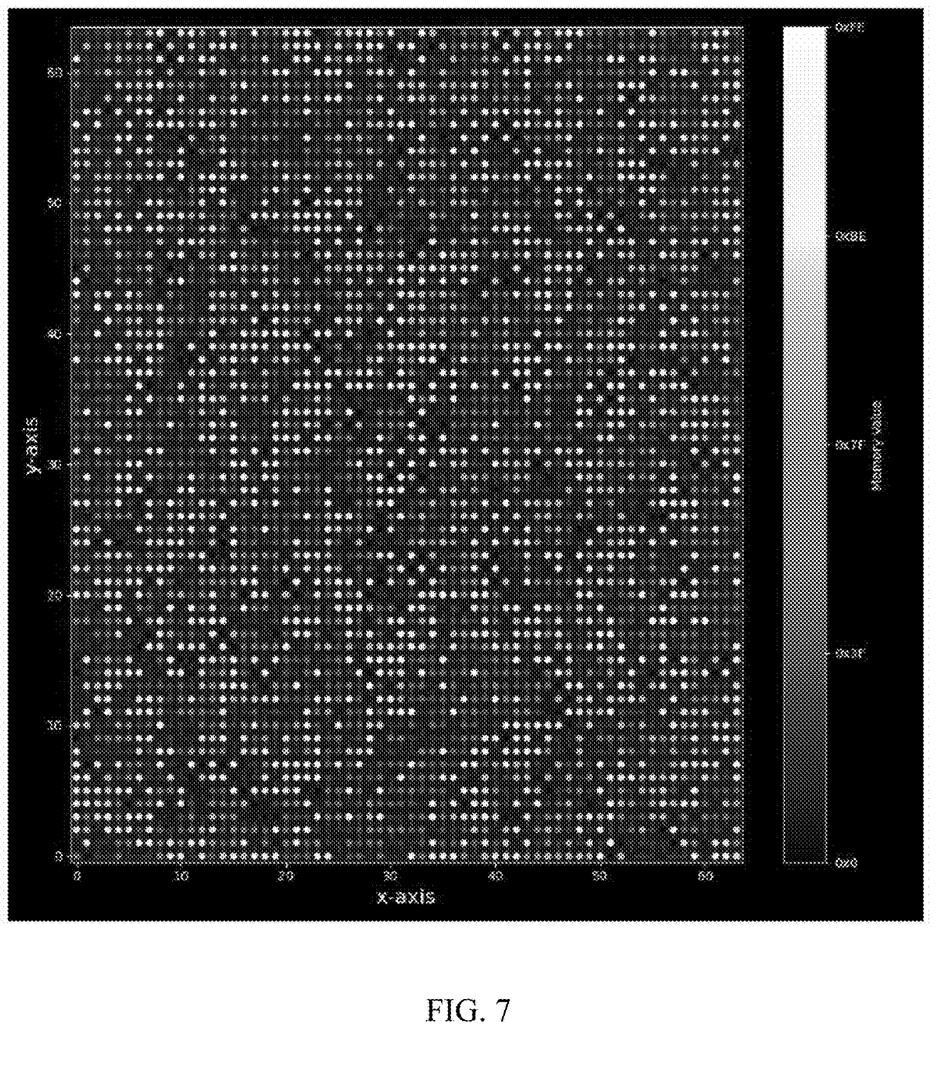
FIG. 7 shows a second iteration of the main loop on the "controlflow" embedded program, plotted along a sixth-order Hilbert curve. While this representation does not depict the full trace, the visualization facilitates a more detailed examination of the data.

FIG. 7 depicts Trace 2 visualized on a sixth-order Hilbert curve. Although the visualization does not encompass the complete trace, it permits detailed inspection of localized memory access patterns and control flow variations within the trace, thereby facilitating in-depth analysis of program execution dynamics and behavior.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for transforming program control flow data into space-filling curves for anomaly detection, the system comprising:
    a processor; and
    a machine-readable medium in operable communication with the processor and having instructions stored thereon that, when executed by the processor, perform the following steps:
    a) collecting inflection points (IFPs) representing execution behavior of an embedded program executed on a microcontroller (MCU) emulated in a virtual environment;
    b) mapping the collected IFPs onto a space-filling curve to generate an image-like spatial representation of a control flow of the embedded program, the space-filling curve providing a locality-preserving transformation of a trace of the control flow of the embedded program; and
    c) utilizing a machine learning (ML) model on the space-filling curve representing execution behavior to detect anomalies, thereby enabling enhanced security measures for an embedded system by modifying execution of the embedded program in response to detected anomalies,
    step b) comprising the sub-steps of
        b1) determining an order of the space-filling curve based on length of dimensional requirements of data of the trace;
        b2) generating a representation of the space-filling curve having a coordinate space sufficient to accommodate a1 data points in the trace;
        b3) mapping each data point from the trace to a unique coordinate on the space-filling curve, following a traversal path of the space-filling curve;
        b4) determining a memory location associated with each data point based on its origin in execution of the embedded program;
        b5) assigning a color value, including a red-green-blue (RGB) value, to each data point based on its associated memory location or region within an address space; and
        b6) rendering a visual representation of mapped trace data on the space-filling curve, that the assigned RGB values visually encode memory distribution or program control flow behavior.

2. The system according to claim 1, step a) comprising the sub-steps of:
    a1) virtualizing the MCU to create a virtual execution environment for the embedded program;
    a2) executing the embedded program within the virtualized MCU environment;
    a3) interfacing with the virtualized MCU using a debugger configured to support program state inspection and instruction tracing;
    a4) extracting assembly-level instructions from the virtualized MCU during execution;
    a5) monitoring memory of the virtualized MCU for changes occurring during execution; and
    a6) collecting data corresponding to one or more IFPs during execution of the embedded program via the debugger interface.

3. The system according to claim 1, each coordinate on the space-filling curve corresponding to a pixel in the generated image-like spatial representation.

4. The system according to claim 1, the ML model used in step c) comprising a convolutional neural network (CNN).

5. The system according to claim 1, the trace comprising a single iteration over a main loop of the embedded program, capturing all IFPs, each iteration generating a corresponding execution trace.

6. The system according to claim 1, the IFPs including control-transfer instructions comprising conditional branch instructions, unconditional jump instructions, and subroutine call instructions.

7. The system according to claim 1, the trace comprising a list of memory locations corresponding to IFPs in the program control flow.

8. The system according to claim 1, the space-filling curve comprising a Hilbert curve used to preserve locality in a spatial mapping.

9. The system according to claim 1, the space-filling curve further comprising an order that defines a maximum capacity of data points, with a number of data points in an execution trace constrained to be less than a total number of points corresponding to the order of the space-filling curve.

10. A method for transforming program control flow data into space-filling curves for anomaly detection, the method comprising:
    a) collecting inflection points (IFPs) representing execution behavior of an embedded program executed on a microcontroller (MCU) emulated in a virtual environment;
    b) mapping the collected IFPs onto a space-filling curve to generate an image-like spatial representation of a control flow of the embedded program, the space-filling curve providing a locality-preserving transformation of a trace of the control flow of the embedded program; and
    c) utilizing a machine learning (ML) model on the space-filling curve representing execution behavior to detect anomalies, thereby enabling enhanced security measures for an embedded system by modifying execution of the embedded program in response to detected anomalies,
    step b) comprising the sub-steps of
        b1) determining an order of the space-filling curve based on length or dimensional requirements of data of the trace;
        b2) generating a representation of the space-filling curve having a coordinate space sufficient to accommodate all data points in the trace;
        b3) mapping each data point from the trace to a unique coordinate on the space-filling curve, following a traversal path of the space-filling curve;
        b4) determining a memory location associated with each data point based on its origin in execution the embedded program;
        b5) assigning a color value, including a red-green-blue (RGB) value, to each data point based on its associated memory location or region within an address space, and
        b6) rendering a visual representation of mapped trace data on the space-filling curve, that the assigned RGB values visually encode memory distribution or program control flow behavior.

11. The method according to claim 10, step a) comprising the sub-steps of:
    a1) virtualizing the MCU to create a virtual execution environment for the embedded program;

a2) executing the embedded program within the virtualized MCU environment;
a3) interfacing with the virtualized MCU using a debugger configured to support program state inspection and instruction tracing;
a4) extracting assembly-level instructions from the virtualized MCU during execution;
a5) monitoring memory of the virtualized MCU for changes occurring during execution; and
a6) collecting data corresponding to one or more IFPs during execution of the embedded program via the debugger interface.

12. The method according to claim 10, each coordinate on the space-filling curve corresponding to a pixel in the generated image-like spatial representation.

13. The method according to claim 10, the ML model used in step c) comprising a convolutional neural network (CNN).

14. The method according to claim 10, the trace comprising a single iteration over a main loop of the embedded program, capturing all IFPs, each iteration generating a corresponding execution trace.

15. The method according to claim 10, the IFPs including control-transfer instructions comprising conditional branch instructions, unconditional jump instructions, and subroutine call instructions.

16. The method according to claim 10, the trace comprising a list of memory locations corresponding to IFPs in the program control flow.

17. The method according to claim 10, the space-filling curve comprising a Hilbert curve used to preserve locality in a spatial mapping, the space-filling curve further comprising an order that defines a maximum capacity of data points, with s number of data points in an execution trace constrained to be less than a total number of points corresponding to the order of the space-filling curve.

18. A system for transforming program control flow data into space-filling curves for anomaly detection, the system comprising:
   a processor; and
   a machine-readable medium in operable communication with the processor and having instructions stored thereon that, when executed by the processor, perform the following steps:
   a) collecting inflection points (IFPs) representing execution behavior of an embedded program executed on a microcontroller (MCU) emulated in a virtual environment;
   b) mapping the collected IFPs onto a space-filling curve to generate an image-like spatial representation of a control flow of the embedded program, the space-filling curve providing a locality-preserving transformation of a trace of the control flow of the embedded program; and
   c) utilizing a machine learning (ML) model on the space-filling curve representing execution behavior to detect anomalies, thereby enabling enhanced security measures for an embedded system by modifying execution of the embedded program in response to detected anomalies, step a) comprising the sub-steps of:
   a1) virtualizing the MCU to create a virtual execution environment for the embedded program;
   a2) executing the embedded program within the virtualized MCU environment;
   a3) interfacing with the virtualized MCU using a debugger configured to support program state inspection and instruction tracing;
   a4) extracting assembly-level instructions from the virtualized MCU during execution;
   a5) monitoring memory of the virtualized MCU for changes occurring during execution; and
   a6) collecting data corresponding to one or more IFPs during execution of the embedded program via the debugger interface, step b) comprising the sub-steps of:
   b1) determining an order of the space-filling curve based on length or dimensional requirements of data of the trace;
   b2) generating a representation of the space-filling curve having a coordinate space sufficient to accommodate all data points in the trace;
   b3) mapping each data point from the trace to a unique coordinate on the space-filling curve, following a traversal path of the space-filling curve;
   b4) determining a memory location associated with each data point based on its origin in execution of the embedded program;
   b5) assigning a color value, including a red-green-blue (RGB) value, to each data point based on its associated memory location or region within an address space; and
   b6) rendering a visual representation of mapped trace data on the space-filling curve, that the assigned RGB values visually encode memory distribution or program control flow behavior, each coordinate on the space-filling curve corresponding to a pixel in the generated image like spatial representation, the ML model used in step c) comprising a convolutional neural network (CNN), the trace comprising a single iteration over a main loop of the embedded program, capturing all IFPs, each iteration generating a corresponding execution trace, the IFPs including control-transfer instructions comprising conditional branch instructions, unconditional jump instructions, and subroutine call instructions, the trace comprising a list of memory locations corresponding to IFPs in the program control flow, and the space-filling curve comprising a Hilbert curve used to preserve locality in a spatial mapping, the space-filling curve further comprising an order that defines a maximum capacity of data points, with a number of data points in the execution trace constrained to be less than a total number of points corresponding to the order of the space-filling curve.

* * * * *